3,023,109
METHOD OF TREATING FRESH RED MEAT FOR STABILIZATION OF COLOR
Leonard Russell Hines, Ridgewood, N.J., assignor to American Cyanamid Company, New York, N.Y., a corporation of Maine
No Drawing. Filed Sept. 1, 1959, Ser. No. 837,370
4 Claims. (Cl. 99—107)

This invention relates to the treatment of fresh red meat for packaging.

Packaged meats are increasingly used and it is customary to use transparent packaging so the color of the meat may be saved. The red meat, and particularly beef, loses its fresh red meat color on storage, even though the meat may be entirely palatable and safe. However, the average housewife purchasing the meat is accustomed to correlating the red color with freshness of the meat and so meat which has its color changed to a more brownish tint, even though perfectly healthy and just as pure and palatable, does not sell readily. The problem of color appearance is therefore a serious one.

According to the present invention, the meat is exposed for a short period of time to an atmosphere containing ammonia. The bright red color is restored if it has been lost and if not is retained for much longer periods of time than in the case of untreated meat. It is not known exactly why the red color is formed and why it is more permanent. Obviously, of course, the ammonia must react in some way with myoglobin and hemoglobin pigments in the meat, but the exact mechanism is not known and it is not intended to limit the present invention to any particular theory as to why the improved result is obtained. However, it is definitely known that the invention is not limited to improving the color of the blood pigments as these pigments account for a part of the color of the meat. The other meat pigments account for most of the color. It is an additional advantage of the present invention that the durability of the red color does not require hermetic sealing; in fact, oxygen permeable packages such as polyethylene bags, wraps, and the like are entirely satisfactory and, in fact, are preferable as the color keeps its bright fresh appearance somewhat better if the container is slightly permeable to oxygen.

There is a limit to the time and concentration of ammonia to be used. In general, the ammonia concentration should be between 5% and 25%. Excellent results are obtained with 10% ammonia and this approximate concentration may be considered preferred. On the other hand, it does not make any difference how the ammonia containing atmosphere is produced. Thus, for example, air may be mixed with the required amount of gaseous ammonia and for many purposes, this is a very desirable method. However, for somewhat smaller scale operations, there are some advantages in using aqua ammonia or other ammonia releasing compounds as the source of ammonia.

Time is a factor. If it is desired to produce soft bright red meat, the exposure time should be not less than about ten seconds and no more than about two minutes. Thirty seconds gives excellent results and an exposure time approximating this is preferred. It is possible to use longer times, however, beyond about three minutes the meat begins to become leathery although its appearance does not change. For some cuts, this may not be desirable, although the meat becomes tender on cooking. However, there is sometimes an advantage to the longer treatment because the leathery surface texture also tends to seal in meat juices which is an advantage. Therefore, whether a short period of time, from ten seconds to two minutes is to be used, or a somewhat longer period of time, from three minutes up to five or six minutes, will be determined by the characteristics which are desired. It is an advantage that the invention may be used for a number of different final meat cuts. It is a further advantage that the moderate exposure time produces a meat product which on cooking is more tender. Why this should be is also not known although it is obvious, of course, that some chemical reaction of the meat with the ammonia must be involved.

The time and ammonia concentration is dictated also by another consideration. Nearer the maximum times there is a tendency for the meat to retain a distinct but not unpleasant odor of ammonia, even for several days. Some housewives do not like this and so there is an advantage in keeping the concentration and exposure time as low as is consistent with the development of a durable red color. This is why it is preferred to use from about 5% to 10% ammonia concentration and exposure times running from ten seconds to thirty seconds or slightly more. It should be understood that the slight residual odor of ammonia disappears entirely on cooking and in no way affects the taste or palatability of the meat. The ammonia odor is undoubtedly due to the presence of a small amount of ammonia over and beyond that which actualy reacts with the myoglobin and hemoglobin pigments to produce the fresh red meat color. It is, of course, not practical to use such small amounts of ammonia as would exactly correspond to the requirements of reaction of the meat pigments. This is too difficult to control and so the times and ammonia concentrations which are given above represent a distinct excess over the amount of ammonia theoretically required in the reaction of the meat pigments. However, the invention is dealing with a practical process of the production of a practical product and so it is necessary to provide for a certain factor of safety to be sure that the desirable characteristics of the reaction are obtained.

It is possible to expose the meat to the ammonia containing atmosphere and then package it. It is also possible, with suitable ammonia permeable meat wrapping films and/or coatings, to package the meat first. If the permeability for ammonia is rather low, of course, the times and in some cases concentrations of ammonia have to be increased. The exposure times set out above are for situations where the meat is freely in contact with the ammonia containing atmosphere. Exact times for treatment with ammonia through permeable packages can, of course, not be given because they would be meaningless since they are determined by the permeability which will vary from one packaging material to another. It is, however, an advantage of the invention that treatment of already packaged meat is possible and in some cases this is an important practical advantage.

It should be realized that the ammonia treatment of the present invention does not and cannot prevent deterioration of the meat which will not keep indefinitely. However, the improved red color is retained for a week or more and therefore satisfactory products are obtained for ordinary retail shelf-life.

The invention will be described in greater detail in the following specific examples.

*Example 1*

Strips of lean beef 2 x ¾ x ⅜ inches were exposed to a 10% ammonia atmosphere for thirty seconds and sixty seconds, respectively, and a control was prepared which was not exposed at all. All of the strips were placed in polyethylene bags and were observed for nine days under ordinary conditions of store shelf-life. The results were that the control became dull red having lost its bright fresh color within a day whereas both of the ammonia treated samples retained the bright red fresh meat color for nine days. They were observed at intermediate periods of one, three and seven days and there was no change in color. At nine days, there was a faintly detectible residual ammonia odor which was stronger with the sixty second exposure than with the thirty second one. On cooking, which was simulated by boiling in water for twenty minutes, there was no detectible ammonia odor or taste and in fact the color of the meat was still satisfactory and the taste entirely natural.

Some of the bags were tightly sealed and others were not, thus permitting more or less free excess of the oxygen to the meat. The bags which were oxygen permeable showed no deterioration and in fact the color was, if anything, somewhat brighter. It should be understood, of course, that the ammonia treatment does not protect the meat against contamination if it is left exposed to the atmosphere where microorganisms may be encountered and therefore normally packaging or some other type of protection against contamination will be needed as is customary.

Example 2

A thin layer of ammonia hydroxide was placed in the bottom of a flask and permitted to become in equilibrium with the atmosphere above it. A piece of fresh lean beef 1½ x ¾ x ⅜ inches was placed in the atmosphere but not in contact with the liquid. A bright red color developed somewhat more slowly than in the case of the gaseous ammonia atmosphere but within ten minutes it was fully developed. The meat with the color was then packaged and retained its bright red color for ten days as in the case of Example 1. In both cases, of course, the meat was kept under the normal refrigeration.

I claim:

1. The method of treating red meat to produce a durable bright red color of the surface corresponding to that of fresh meat which comprises subjecting the meat to an atmosphere containing from 5% to 25% of ammonia for a period of time ten seconds to five minutes.

2. The method of treating red meat to produce a durable bright red color of the surface corresponding to that of fresh meat which comprises subjecting the meat to an atmosphere containing from 5% to 25% of ammonia for a period of time ten seconds to two minutes.

3. The process according to claim 2 in which the concentration of ammonia gas is approximately 10% and the exposure time is approximately thirty seconds.

4. The method of treating packaged red meat to produce a durable bright red color of the surface corresponding to that of fresh meat which comprises subjecting red meat packaged in an ammonia permeable package to an atmosphere containing at least 5% of ammonia for a period of time ten seconds to five minutes.

References Cited in the file of this patent

UNITED STATES PATENTS 2,541,572     Coleman et al.  ---------- Feb. 13, 1951

FOREIGN PATENTS 517,079     Great Britain  ----------- Jan. 19, 1940